(12) United States Patent
Huignard et al.

(10) Patent No.: US 7,489,404 B2
(45) Date of Patent: Feb. 10, 2009

(54) FIBER-OPTIC INTERFEROMETRIC ROTATION SPEED SENSOR INCLUDING A NON-LINEAR MIRROR

(75) Inventors: Jean-Pierre Huignard, Paris (FR); Arnaud Brignon, Bourg la Reine (FR)

(73) Assignee: Thales (FR)

( * ) Notice: Subject to any disclaimer, the term of this patent is extended or adjusted under 35 U.S.C. 154(b) by 175 days.

(21) Appl. No.: 10/573,073

(22) PCT Filed: Aug. 25, 2004

(86) PCT No.: PCT/EP2004/051904

§ 371 (c)(1),
(2), (4) Date: Mar. 23, 2006

(87) PCT Pub. No.: WO2005/031261

PCT Pub. Date: Apr. 7, 2005

(65) Prior Publication Data

US 2007/0052969 A1   Mar. 8, 2007

(30) Foreign Application Priority Data

Sep. 26, 2003   (FR) .................................. 03 11317

(51) Int. Cl.
*G01C 19/64* (2006.01)
(52) U.S. Cl. ..................................... 356/460
(58) Field of Classification Search ................ 356/460, 356/461, 464, 465
See application file for complete search history.

(56) References Cited

U.S. PATENT DOCUMENTS

| 3,874,785 A | 4/1975 | Huignard |
| 4,001,635 A | 1/1977 | d'Auria et al. |
| 4,286,838 A | 9/1981 | Huignard et al. |
| 4,304,458 A | 12/1981 | Huignard et al. |
| 4,306,763 A | 12/1981 | Huignard |
| 4,383,734 A | 5/1983 | Huignard et al. |
| 4,403,352 A | 9/1983 | Huignard et al. |
| 4,442,455 A | 4/1984 | Huignard et al. |
| 4,492,468 A | 1/1985 | Huignard et al. |
| 4,543,662 A | 9/1985 | Huignard et al. |
| 4,575,245 A * | 3/1986 | Borde ......................... 356/450 |

(Continued)

OTHER PUBLICATIONS

Brignon et al, Phase conjugation in a continuous-wave diode-pumped Nd:YVO4 laser, Applied Physics B, pp. 159-162, 1999.*

(Continued)

*Primary Examiner*—Samuel A Turner
(74) *Attorney, Agent, or Firm*—Lowe Hauptman Ham & Berner, LLP

(57) ABSTRACT

An fiber-optic interferometric rotation sensor device has a laser source combined with an optical fiber. These are configured to cause interference between a beam from the laser source and a beam coming from the optical fiber. The laser source includes an optical cavity having a gain lasing medium. The sensor device includes, along the path of the beam output by the laser cavity, a beam splitter device associated with a mirror, wherein the beam split off from the beam output by the laser cavity is sent into one of the ends of the optical fiber and directed from the other end toward the gain lasing medium to form a nonlinear mirror. The splitter device is followed by a detector.

10 Claims, 2 Drawing Sheets

U.S. PATENT DOCUMENTS

| | | | |
|---|---|---|---|
| 4,659,223 A * | 4/1987 | Huignard et al. | 356/459 |
| 4,765,740 A | 8/1988 | Fischer | |
| 4,836,629 A | 6/1989 | Huignard et al. | |
| 4,944,591 A * | 7/1990 | McMichael | 356/460 |
| 5,004,341 A * | 4/1991 | Grynberg et al. | 356/459 |
| 5,034,627 A | 7/1991 | Ayral et al. | |
| 5,045,719 A | 9/1991 | Ayral et al. | |
| 5,298,740 A | 3/1994 | Ayral et al. | |
| 5,402,261 A | 3/1995 | Huignard et al. | |
| 5,428,697 A | 6/1995 | Dolfi et al. | |
| 5,535,041 A | 7/1996 | Ayral et al. | |
| 6,674,782 B2 * | 1/2004 | Roosen et al. | 372/94 |
| 6,834,061 B2 | 12/2004 | Huignard et al. | |
| 2004/0047533 A1 | 3/2004 | Huignard | |

OTHER PUBLICATIONS

Ph. Graindorge et al. "Fused reciprocity using phase conjugation" in Fiber Optic Rotation Sensors—Springer Verlag, 1982.

A. Brignon et al. "Phase conjugation in a continuous wave diode pumped Nd:YVO4 laser" in Applied Physics B, 1999.

P. Sillard et al. "Gain grating analysis of self-starting etc." IEEE—J. Q.E., Mar. 1998.

U.S. Appl. No. 07/450,399, filed Dec. 14, 1989.

U.S. Appl. No. 07/815,850, filed Dec. 31, 1991.

* cited by examiner

FIBER-OPTIC INTERFEROMETRIC ROTATION SPEED SENSOR INCLUDING A NON-LINEAR MIRROR

The present invention relates to a fiber-optic interferometric rotation speed sensor device (or gyroscope).

The rotation speed sensor device to which the invention relates is based on the principle of the interference of two waves, in which one of the mirrors is a nonlinear optical component of the phase-conjugate mirror type. The gyroscope system produced from this sensor relies on the following two properties of the interferometer, which were demonstrated for the first time in the following reference: Ph. Graindorge et al., "Fused reciprocity using phase conjugation" in Fiber Optic Rotation Sensors—Springer Verlag, 1982.

These properties are the following:

if a reciprocal phase shift $\delta\phi_r$ is introduced into the signal arm, it is not seen by the detector $(+\phi_r, -\phi_r = 0)$;

if a nonreciprocal phase shift $(\phi_{nr}$ is introduced into the signal arm, the phase variation of 2 $\phi_{nr}$ is measured after detection.

Consequently, the interferometer sees only the nonreciprocal phase shift effects—this is the case of the Sagnac effect, used to advantage for producing a rotation speed sensor.

The conjugate wave is generated in the lasing medium itself. This is a solid-state monomode monofrequency source. Effective phase conjugation experiments have already been the subject of publications, in particular in Nd:YAG and Nd:YVO$_4$ lasers (see A. Brignon et al., "Phase conjugation in a continuous wave diode pumped Nd:YVO$_4$ laser" in Applied Physics B, 1999). To produce a gyroscope, the beam output by the laser is injected into a fiber loop (of diameter D and having N turns, which means that the length L of the fiber fiber is: L=N$\pi$D ).

Gyroscopes based on a polarization-maintaining monomode optical fiber are known. Such an optical fiber is relatively difficult to align optically with the optical devices that have to be coupled to it.

The subject of the present invention is a fiber-optic rotation speed sensor that can use a large-core optical fiber, which is easy to align optically with the devices that are associated therewith.

The fiber-optic interferometric rotation speed sensor device of the invention comprises a laser source combined with an optical fiber and with a device for making the beam from the laser source interfere with the beam coming from the optical fiber, and it is characterized in that the laser source is an optical cavity having a gain lasing medium and in that it includes, along the path of the beam output by the laser cavity, a beam splitter device associated with a reflecting device, the beam split off from the beam output by the laser cavity being sent into one of the ends of the optical fiber, the other end of which is directed toward the gain lasing medium, the splitter device being followed by a detector.

The present invention will be better understood on reading the detailed description of an embodiment, given by way of non-limiting example and illustrated by the appended drawing in which.

Figure 1:
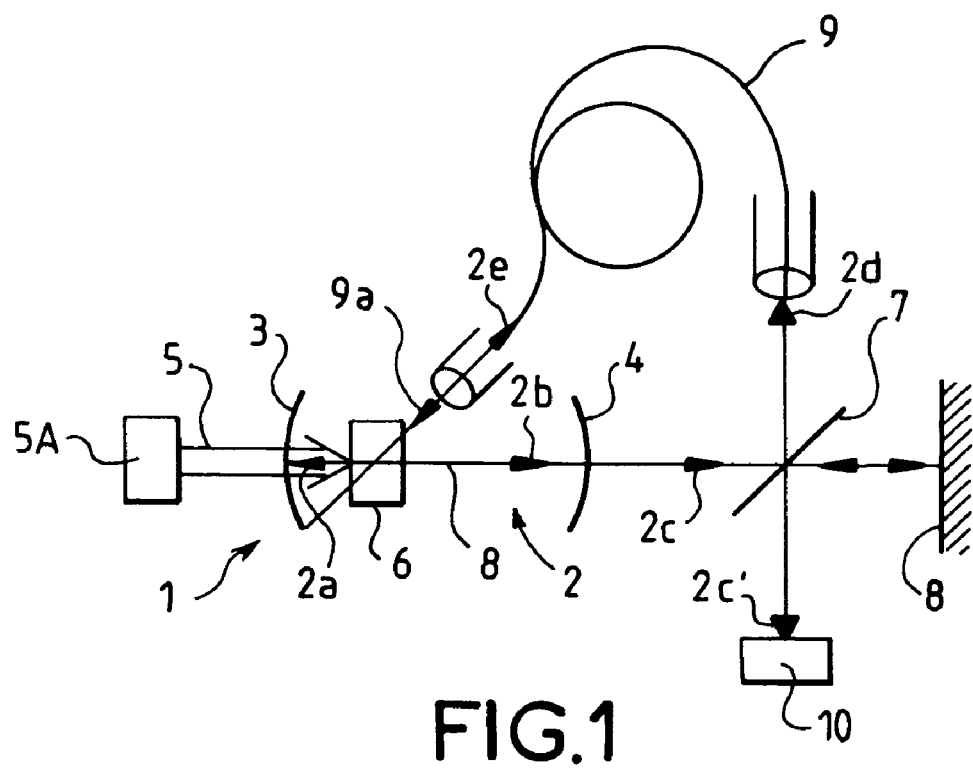
FIG. 1 is a simplified diagram of an interferometric sensor according to the invention.

The interferometric device shown schematically in FIG. 1 comprises a compact laser 1, which in the present case is a gain medium formed by an optical cavity 2 defined between two mirrors 3, 4 and pumped by a beam 5 emitted by pumping diodes 5A, a lasing medium 6 being placed in this cavity 2. This laser is monomode and monofrequency, operates in continuous mode and is polarized. Two counter-propagating beams 2a and 2b oscillate inside the cavity 2. Placed in the path of the output beam 2c of the laser 1 are a splitter plate 7 and, behind this plate, in the extension of the same path, a mirror 8, which is perpendicular to this path. The beam 2d, split off by the plate 7 from the beam 2c, is injected into one end of the uniformly coiled optical fiber 9 in the form of a flat coil. The other end of the fiber 9 is directed toward the center of the lasing medium 6 in order to intersect beams 2a and 2b therein. The beam 9a output by the fiber 9 in the direction of the gain medium 6 interferes with the beams 2a and 2b inside the medium 6, creating a dynamic hologram. The beams 2a and 2b, by diffracting on this hologram, generate a conjugate beam 2e which is sent into the fiber 9. On leaving the fiber 9, this beam 2e passes through the plate 7 and arrives on a photoelectric detector 10, on which also arrives a beam 2c' that represents that part of the beam 2c reflected by the mirror 8 and by the plate 7 toward the detector 10. These two beams 2e and 2c' interfere with each other on the detector 10.

The assembly described above is equivalent to a Michelson interferometer, in which one of the mirrors is a nonlinear mirror formed by the gain medium 6.

At the photodetector 10, if $\phi$ is the phase shift between the two beams 2e and 2c', the expression for the intensity detected by the detector 10 is of the form: $I_D = I_0 (1 + \cos \phi)$. The position of the mirror 8 is chosen so as to satisfy the condition $\phi = \pi/4$, which allows the interferometer to operate in its linear response zone. Under these conditions, the signal $I_D$ output by the photodetector 10 is written as:

$$I_D = \frac{I_0}{2} \delta\varphi_{NR}$$

where $\delta\phi_{NR}$ is the nonreciprocal phase shift due to the Sagnac effect in the N-turn fiber loop 9, and $$\delta\varphi_{NR} = \frac{4\pi LD}{\lambda_0 c_0} \Omega$$

where:

$\Omega$ = angular rotation speed of the coil of optical fiber 9;

D = diameter of the coil of optical fiber 9;

L = length of the optical fiber;

$\lambda_0$ = wavelength of the laser 1 in vacuo; and $c_0$ = speed of light in vacuo.

Figure 2:
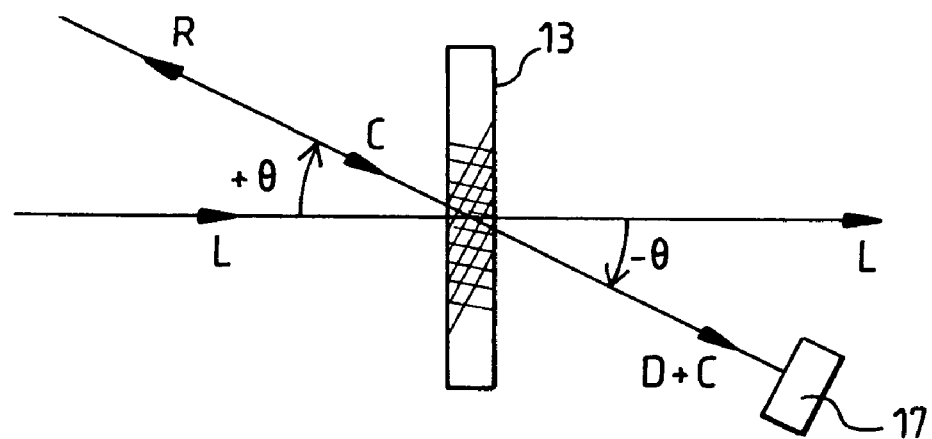
FIG. 2 is a simplified diagram of a diffractive splitter that can be used in the sensor of the invention.
Figure 3:
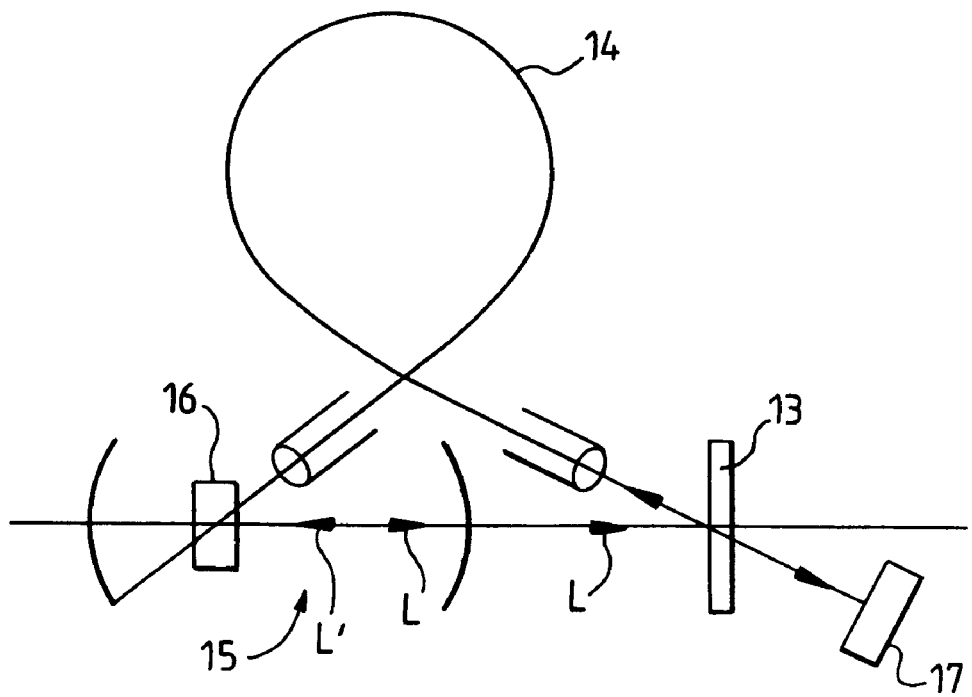
FIG. 3 is a simplified diagram of an interferometric sensor according to the invention, incorporating the splitter of FIG. 2.

Another embodiment of the device of the invention is shown in FIGS. 2 and 3, FIG. 2 representing a detail of the assembly shown schematically in FIG. 3. The sensor device shown in FIG. 3 is similar to that of FIG. 1, with the main difference that the beam splitter 7 is replaced with a diffraction grating operating both in reflection mode and in transmission mode. This sensor device essentially comprises a laser cavity 15, similar to the cavity 2, a flat coil of optical fiber 14 and a reflecting beam splitter device 13, shown in detail in FIG. 2.

More precisely, as indicated in FIG. 2, the beam L output by the laser cavity 15 is diffracted in the $\pm\theta$ direction, by reflection (beam R) and by transmission (beam D) respectively. This type of grating is for example produced in a manner known per se by holographic techniques for writing into photopolymer materials (a photoinduced index grating or a relief grating). These two types of grating may also be multiplexed within the actual volume of photopolymer material. The reflected beam R is coupled into the coil of fiber 14 (FIG. 3) and then conjugated after reflection on the nonlinear mirror that the lasing medium 16 constitutes (similar or identical to that of the cavity 2 in FIG. 1). The conjugate beam C is sent into the fiber 14 and interferes in the grating 13 with the beam L output by the source. The benefit of this diffractive component is that the condition $\phi=\pi/4$ for interferometric detection can be easily satisfied. By interfering with the beam L, the conjugate beam C creates a fringe structure, the period of which corresponds to the pitch of the transmission grating. Under these conditions, the beam C transmitted directly by the grating and the beam D output by the diffraction of L by the grating 13 interfere on the detector 17. It is known from the phenomenon of beam coupling by gratings that the phase shift between the two beams D and C is controlled by the position of the grating relative to the interference fringes formed by interference between C and L. A quarter-period spatial shift of the grating while it is being written will ensure that the linear detection condition is met.

The rotation speed sensor based on a fiber interferometer according to the invention is compatible with the use of a multimode fiber. Insofar as a four-beam mixing function is carried out in the cavity (namely with the beams L and L', which propagate in opposite directions in the cavity 15, and the beams R and C), the beam output by the fiber may be multimode: by phase conjugation, there is again a plane-wave beam C identical to that injected into the coil of optical fiber.

Figure 4:
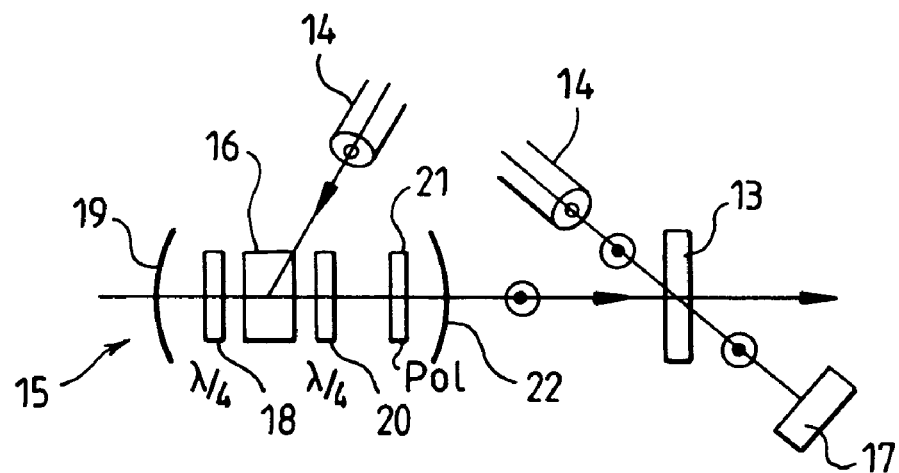
FIG. 4 is a partial diagram of an interferometric sensor according to the invention, using a non-polarization-maintaining optical fiber.

The operating principle of the device according to the invention is also compatible with the use of a non-polarization-maintaining optical fiber. As mentioned in the reference: "Gain grating analysis of self-starting etc." by P. Sillard et al., IEEE—J.Q.E., March 1998, this function is obtained by introducing into the cavity 15 (FIG. 4) a first quarter-wave plate 18, between the mirror 19 and the gain lasing medium 16, a second quarter-wave plate 20 on the other side of the lasing medium, and a polarizer 21 between the plate 20 and the second cavity mirror 22. The two quarter-wave plates 18, 20 and the polarizer 21 make it possible to create two counter-propagating laser beams, of mutually orthogonal circular polarizations (namely a left circular polarization and a right circular polarization). It is also known that four-beam mixing with these two circularly polarized beams makes it possible to perform the vector phase conjugation, that is to say the depolarization of the fiber is thus corrected.

According to embodiments of the device of the invention, the lasing medium was Nd:YAG then ND:YVO$_4$, the fiber was monomode, then low-loss multimode, and the diffractive component was produced by holography on a photopolymer material.

The advantages of the device of the invention are the following:

it employs a compact continuous laser source pumped by diodes and serving to generate a conjugate wave by intracavity four-beam mixing;

the use of a beam splitter produced by a diffractive component makes it possible to operate in the linear response region of the interferometer;

the device may use a coil of non-polarization-maintaining monomode fiber or multimode fiber; and the interferometer is sensitive only to nonreciprocal phase shift effects.

In particular, its operating point is unaffected by the slow variations (due to temperature variations) of the optical path in the fiber coil.

The invention claimed is:

1. A fiber-optic interferometric rotation speed sensor device comprising:

a laser source comprising an optical cavity including a gain lasing medium;

an optical fiber; and a beam splitter device disposed in a path of a beam output by the optical cavity, the beam splitter splitting off a split off beam from the beam output by the laser cavity and directing the split off beam into a first end of the optical fiber, the optical fiber being configured and arranged to conduct the split off beam and direct it via a second end of the optical fiber into the gain lasing medium to induce interference within the optical cavity and form a nonlinear mirror, the the non-linear mirror directing a conjugate beam into the second end of the optical fiber; and a detector arranged with the beam splitter device and the first end of the optical fiber to receive the conjugate beam via the beam splitter.

2. The device as claimed in claim 1, further comprising a reflecting device associated with the splitter, the reflecting device comprising a mirror.

3. The device as claimed in claim 1, wherein the splitter comprises a diffraction grating operating both in reflection and in transmission, thus acting as a reflecting device.

4. The device as claimed in claim 2, wherein the position of said mirror is selected so as to obtain a $\pi/4$ phase shift between the beam reflected by said mirror and the beam coming from the optical fiber.

5. The device as claimed in claim 3, wherein the grating comprises an index grating.

6. The device as claimed in claim 3, wherein the grating comprises a relief grating.

7. The device as claimed in claim 3, wherein the grating comprises a grating resulting from a multiplexing of index grating characteristics and relief grating characteristics.

8. The device as claimed in claim 1, wherein the optical fiber comprises a multimode fiber.

9. The device as claimed in claim 1, wherein two quarter-wave plates and a polarizer are included in the optical cavity.

10. The device as claimed in claim 9, wherein the optical fiber comprises a non-polarization-maintaining fiber.

* * * * *